(12) United States Patent
Berard et al.

(10) Patent No.: US 7,914,007 B2
(45) Date of Patent: Mar. 29, 2011

(54) SEGMENTED SEAL WITH HYDRODYNAMIC FEATURE AND ASSEMBLY

(75) Inventors: Gerald M. Berard, North Providence, RI (US); Edward N. Ruggeri, Westport, MA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/345,743

(22) Filed: Dec. 30, 2008

(65) Prior Publication Data

US 2010/0164183 A1 Jul. 1, 2010

(51) Int. Cl.
*F16J 15/16* (2006.01)
(52) U.S. Cl. ........................ 277/544; 277/543
(58) Field of Classification Search .................. 277/540, 277/543, 547, 544
See application file for complete search history.

(56) References Cited

U.S. PATENT DOCUMENTS

| | | | | |
|---|---|---|---|---|
| 4,082,296 | A | * | 4/1978 | Stein ............................ 277/400 |
| 4,145,058 | A | * | 3/1979 | Hady et al. .................... 277/366 |
| 5,169,159 | A | * | 12/1992 | Pope et al. .................... 277/422 |
| 5,509,664 | A | * | 4/1996 | Borkiewicz ................... 277/543 |
| 5,516,118 | A | * | 5/1996 | Jones ............................ 277/400 |
| 6,145,843 | A | * | 11/2000 | Hwang .......................... 277/400 |
| 2008/0042364 | A1 | | 2/2008 | Zheng et al. |
| 2008/0272552 | A1 | | 11/2008 | Zheng et al. |
| 2008/0284105 | A1 | | 11/2008 | Vasagar et al. |

FOREIGN PATENT DOCUMENTS

DE 29818004 U1 12/1998
EP 0992723 A2 12/2000

OTHER PUBLICATIONS

European Patent Office, International Search Report and Written Opinion issued in counterpart PCT Application No. PCT/IB2009/007875, mailed May 17, 2010.

* cited by examiner

*Primary Examiner* — Daniel P Stephenson
(74) *Attorney, Agent, or Firm* — Dykema Gossett PLLC

(57) ABSTRACT

A segment of a seal assembly for sealing a higher pressure area against a rotating member is disclosed. The segment may include a radial external surface, a radial internal surface for sealing against a rotating member, a feed cavity, a ramp portion in communication with the feed cavity, a segment trough in communication with the ramp portion, one or more hydrodynamically-configured pads including an entrance; and a sealing dam disposed between the lift pad and the radial internal surface. The ramp portion may be configured to pick up air flow with an increase in velocity from the rotating member, and the trough or a flow-control portion may be configured to prevent fluid from flowing around or circumventing the pad entrance to, at least in part, provide a dynamic feed.

7 Claims, 6 Drawing Sheets

SEGMENTED SEAL WITH HYDRODYNAMIC FEATURE AND ASSEMBLY

TECHNICAL FIELD

The present invention relates to radial seal assemblies, including segmented radial seal assemblies.

BACKGROUND

Segmented carbon radial or circumferential seals have been employed in a number of environments associated with compressible fluids, such as gases. They have been used, for example, in connection with gas turbine engines. Such radial seals typically act to, among other things, seal high pressure areas from low pressure areas. For example, such seals have been used for inhibiting oil or oil-air mist from leaking into the air system in bearing locations.

Performance of segmented seals is commonly dependent upon shaft speed and contact pressure between segmented seals and a shaft, where the most challenging condition is experienced at maximum speed and pressure. The life of conventional contacting seals is generally characterized by a parameter referred to as a "PV" value. The PV value is generally defined as the product of the seal surface speed and the surface contact pressure. With segmented seals, the surface contact pressure consists of two parts—the unbalanced pressure force in the radial direction and the mechanical spring (e.g., garter spring) closure force. For dry running seals the PV limit may, for instance be limited to, approximately 10,000 psi-ft/min. Since many of the parameters—such as system and discharge pressures and shaft speed—are commonly dictated by application for segmented seals, the principal way to remain below the PV limit of the material is to reduce overall contact pressure by reducing dam width. Consequently, many conventional seals rely solely on a geometrical means for reducing PV.

Another potential issue with conventional segmented radial seals is the amount of heat generation, which is a function of contact pressure and shaft speed. If the environmental temperature of fluid flow does not allow the heat to be transferred away effectively, then the heat generated by the seal can result in coking around the seal or excessive seal wear, which can eventually contribute to seal failure.

Attempts have been made to address the foregoing issues but have resulted in only limited success in the reduction of PV limitations. Some designs employ long and shallow circumferential grooves and high pressure vent holes to create a hydrodynamic lift force to help reduce contact pressure. This can provide good opening force near the trailing end of the segment. However, the hydrodynamic force on the leading end of the segment would be minimal. An overall lift would necessitate nearly perfect collaboration from all segments of the seal which may not be practical or likely.

Other designs attempt to use standard Rayleigh pads to generate hydrodynamic opening forces to enable the seal to operate in a non-contacting condition. With such "static system pressure feed" designs, multiple pads may need to be provided on a single segment. With this type of approach, the opening force can be more evenly distributed along the circumferential direction. However, in the application of Rayleigh pads in a circumferential sealing element, such as a segmented seal or any sealing element in which the primary portion of the seal is in intimate contact with a rotating element (e.g., a shaft), there is a reliance on the rotation of the shaft to feed the pad. There are losses that affect the pad's ability to generate and hold hydrodynamic pressure when used in the circumferential sealing application. The fluid enters the deep groove axially along the shaft adjacent to the pad, and the deep groove is the fluid supplier to the pad. The fluid that enters the deep feeding groove must turn 90 degrees from the direction of rotation to enter the Rayleigh pad area. Such a sharp turn of the fluid to enter the pad and the abrupt transition at the entrance are where losses can occur.

However, even with such recent advancements, there are commonly shaft speed limitations and, for some designs, the configuration may prevent fluid from adequately feeding the pad when above certain relative speed ranges. With surface imperfections and entrance losses, this could reduce the cavity pressure to value below the system pressure thereby starving the pad of fluid and reducing or eliminating hydrodynamic lift-off or separation.

The present invention addresses some of these and/or other challenges associated with radial seal assemblies, including segmented radial seal assemblies.

SUMMARY

A segment of a seal assembly for sealing a higher pressure area against a rotating member is disclosed. In an embodiment the segment comprises a radial external surface, a radial internal surface for sealing against a rotating member, a feed cavity, a ramp portion in communication with the feed cavity, a segment trough in communication with the ramp portion, one or more hydrodynamically-configured pads including an entrance; and a sealing dam disposed between the lift pad and the radial internal surface. In an embodiment of the segment, the ramp portion is configured to pick up fluid flow with an increase in velocity from said rotating member, and the trough or a flow-control portion is configured to prevent fluid from flowing around or circumventing the pad entrance to, at least in part, provide a dynamic feed of a pad.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications, and equivalents, which may be included within the spirit and scope of the invention as defined by the appended claims.

Figure 1:
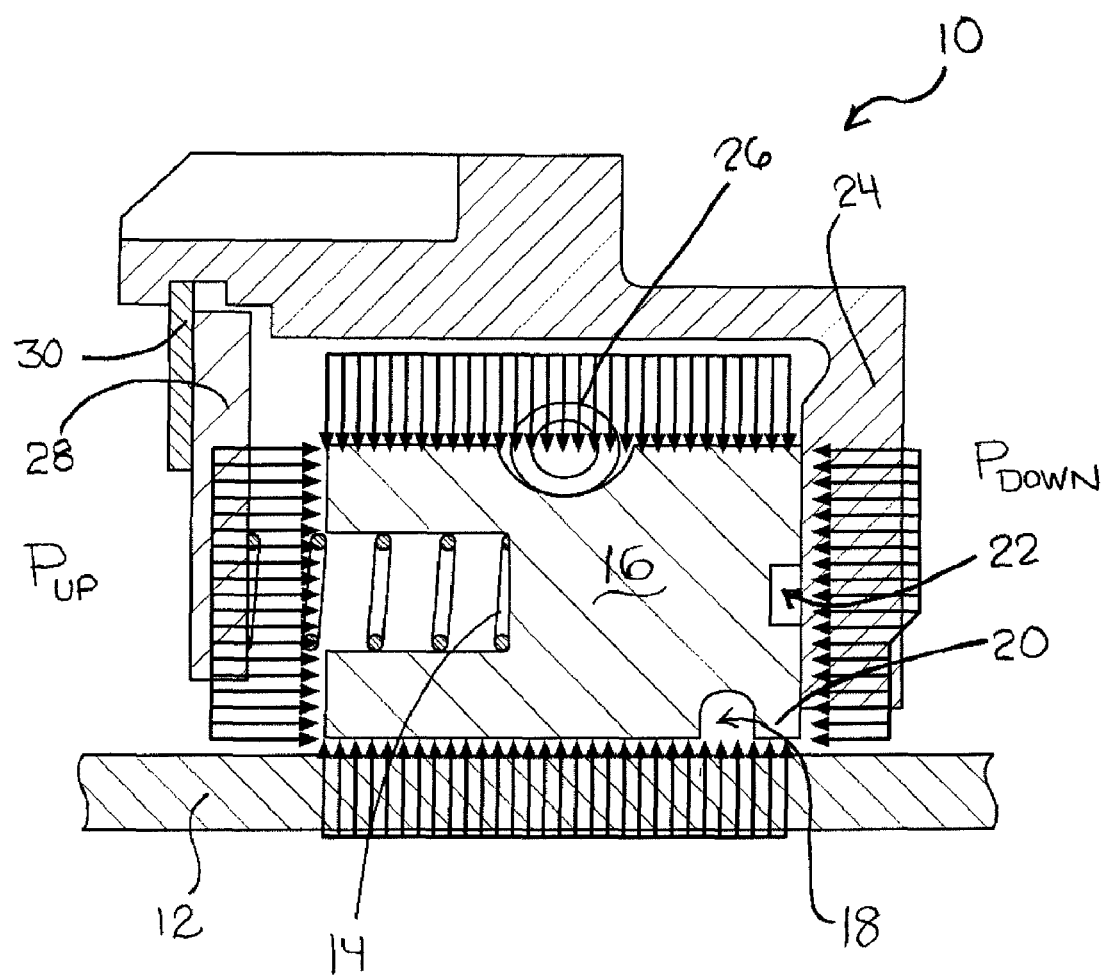
FIG. 1 is a cross sectional representation of a conventional segmented radial seal and associated pressure distribution.

A cross section of a conventional segmented carbon radial seal with a pressure distribution is generally illustrated in FIG. 1. The illustrated segmented carbon radial seal assembly 10 includes, among other things, a runner 12; a coil spring 14; a sealing ring 16 with an annulus 18; dam 20; and a pressure balance groove 22; a flange 24; a garter spring 26; a closing ring 28; and a retainer 30.

As noted, some current designs have begun to incorporate scoop features that are added to the entrance of the Rayleigh pads to, inter alia, help alleviate a sharp (e.g., 90-degree type) turn and associated losses. An example of a design that includes a scoop feature for a radial seal assembly is taught in copending, commonly-owned U.S. patent application Ser. No. 11/743,005, which is incorporated herein in its entirety by reference. Such scoop designs can aid a smooth transition between the deep groove and associated Rayleigh pad to enhance the feeding of the groove.

Figure 2:
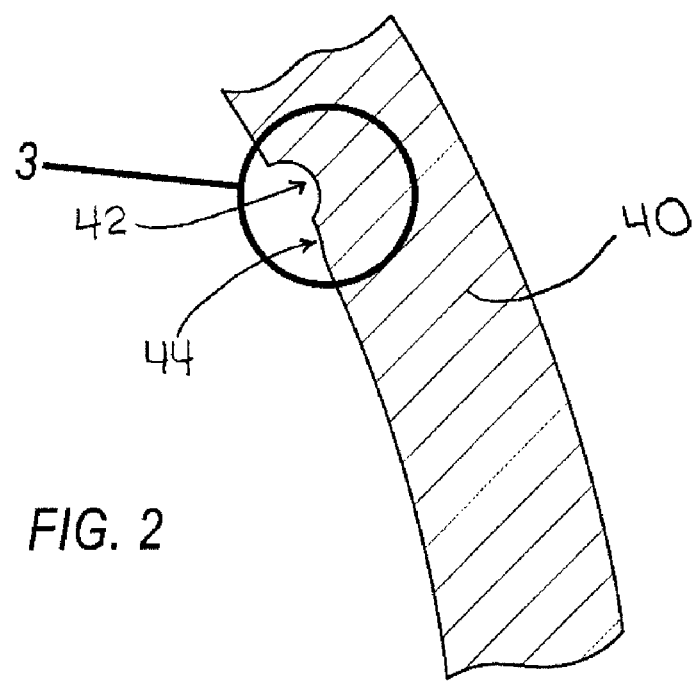
FIG. 2 is a partial sectional view of seal ring segment including a scoop feature and a deep groove pad according to an embodiment of the invention.
Figure 3:
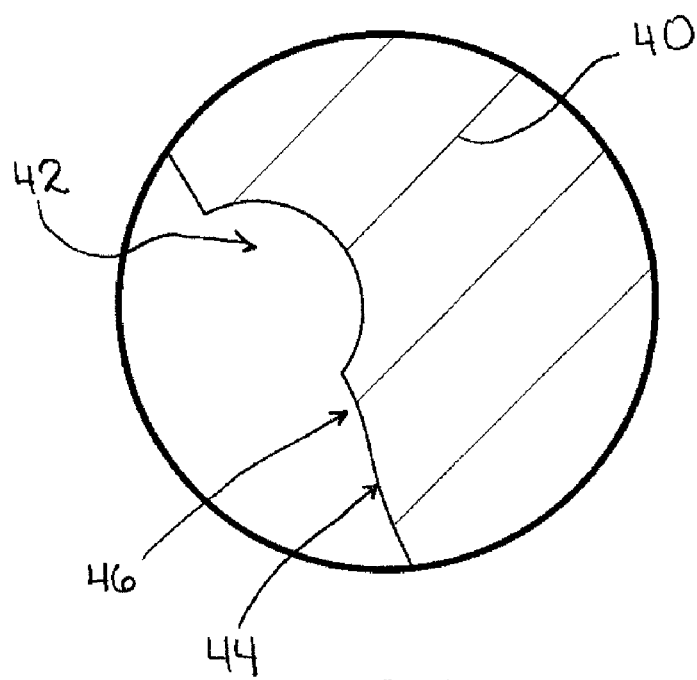
FIG. 3 is an enlarged view of a portion of the ring segment illustrated in FIG. 2.

FIG. 2 generally illustrates a partial axial view of a segment of a radial seal segment 40. The illustrated seal segment 40 includes a transverse groove 42 and a ramped portion 44. As better shown in the enlarged partial view shown in FIG. 3, a scooping groove 46 (also referred to as a "scoop") may be provided between the ramped portion 44 and the transverse groove 42. For some embodiments, the scoop 46 will smoothly transition into a portion of the ramped portion 44. The inclusion of such a scooping groove, or scoop, can be used to not only reduce entrance losses, but may also serve to facilitate a substantially continuous and smooth supply of fluid to feed the pad. Such an assembly envisions the feeding of the pad through static system pressure.

However, among other things, the present invention further contemplates the dynamic feeding of the groove through a gradual transition along the axial face on the pressure side of the segmented seal. With such an enhancement, the tangential velocity of the fluid and boundary layer can include a fluid velocity component associated with the feeding of the pad groove. Consequently, in embodiments of the present invention, a groove may be supplied by a combination of a fluid pressure static component and a fluid velocity pressure component.

Figure 4:
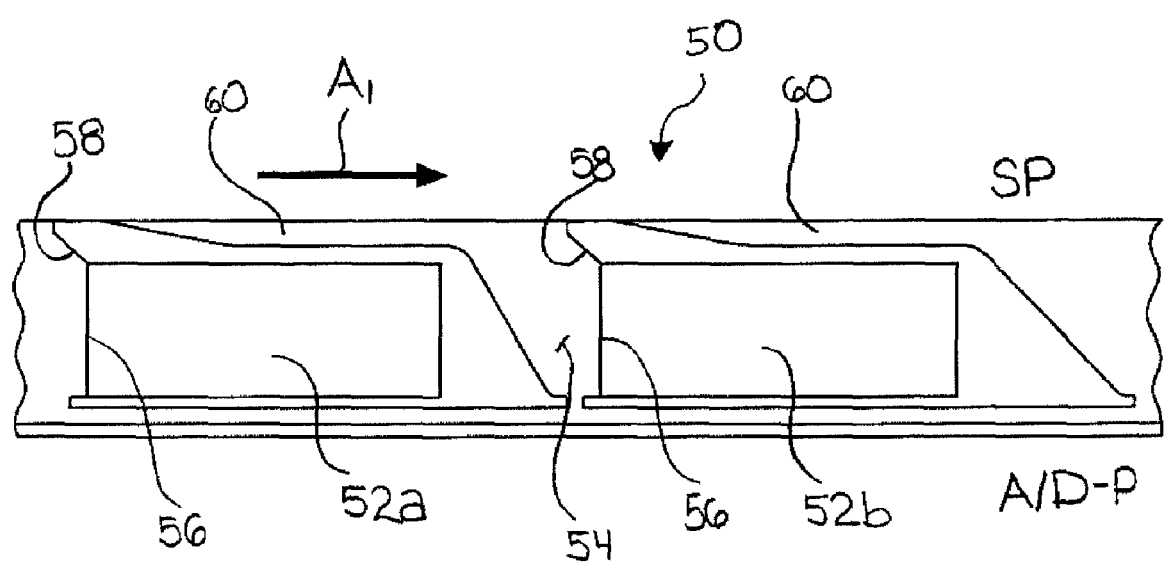
FIG. 4 is view of a bore region of a seal ring segment looking from an inner diameter to an outer diameter.

Turning to FIG. 4, an embodiment of the invention that provides a feed using a combination of a fluid pressure static component and a fluid velocity pressure component is generally illustrated. The illustrated embodiment includes a view of a bore region of a portion of a seal ring segment 50 viewed looking from an inner diameter to an outer diameter. The illustrated portion of a seal ring segment 50 includes lift augmentation formations 52a, 52b, also referred to as "pads" (or hydrodynamic pads), which may comprise Rayleigh-type pads, and a cavity (or pad/feed reservoir) 54 disposed between adjacent pads 52a and 52b. The associated lift augmentation formations 52a, 52b (or pads) each further include a pad entrance 56, a flow control formation 58 (or blocking formation), a pad reservoir portion (associated with the pads 52a, 52b), and an exit ramp 60. The pad reservoir portion may be configured to form a boundary to retain fluid during rotation.

With continued reference to FIG. 4, arrow $A_1$ generally illustrates the direction of rotation for an associated shaft. Further, SP generally designates the side of the segment 50 encountering system pressure, and A/D-P generally designates the side of the segment 50 encountering atmosphere/discharge pressure. In embodiments, the segment can pick up air (airflow)—for example air that would be just under the depicted arrow $A_1$ and increase the velocity (e.g., going left-to-right as depicted) and filling an associated pad reservoir 54. The flow-control formation 58 can serve, among other things, to help direct fluid to an entrance 56 and prevent the fluid from going around a corner of, or otherwise circumventing, the entrance 56. In an embodiment, the flow-control formation 58 may include an angled segment (for example as generally illustrated) and may be configured to direct flow towards an associated pad entrance 56. That is, the flow-control formation 58 helps create a boundary for the fluid so that the fluid cannot leave a bound region associated with a pad (i.e., a pad reservoir portion). A net result of such a configuration can be the pressurization of fluid utilizing the velocity of an associated shaft.

Such designs and configurations in accordance with teachings of the present invention can, inter alia, eliminate rotational speed limitations associated with higher-speed applications. For example, without limitation, embodiments of the present invention may be utilized for applications having speeds up to 575 ft/sec or greater. Further, such systems can provide increased efficiency of the fluid flow into the pads, which can increase the associated pad's capabilities and overall performance. As such, segmented seals having hydrodynamic-effect pads as taught by the present invention may be configured, and even "tuned," to meet the needs of specific seal applications—including those envisioned for high-speed applications.

As previously noted, the present invention provides an enhancement with respect to conventional segmented radial seals. Conventional seals commonly depend upon static pressure balancing to reduce the overall maximum PV of the seal. Some prior designs—including those taught in copending, commonly-owned U.S. patent application Ser. No. 11/743, 005—provide for, among other things, a deep groove axial feed through static system pressure. Such designs provide for hydrodynamic lift through deep groove lift augmentation formations (e.g., Rayleigh type pads) that essentially provide a non-contacting radial seal that is not limited by the PV limitation of the segmented seal material except, for instance, during associated startup and shutdown conditions. At high shaft speeds, however, the pressure in the axial cavity may actually reduce the cavity pressure to a value below the system pressure. As taught by the present invention, and discussed in further detail herein, changes in the axial face of the feeding groove can help address such a condition by reducing entrance losses and allowing the passage of additional system pressure to enter the pad feed cavity 54. With prior designs, the maximum cavity pressure obtainable would generally be limited to the system pressure. With embodiments of the present invention, once the pressure becomes higher than system pressure, some of the "excess" pressure may be used in other areas where system pressure is unavailable, such as, for example and without limitation, at high altitudes.

In accordance with teachings of the present invention, a dynamic feeding groove design—for example, as generally illustrated in FIG. 4—can be included. With the addition of a pressure velocity component, the pad feed cavity pressure can exceed the system pressure, thus increasing the performance capability of the segmented seal and permitting enhancement and optimization (i.e., tuning) a seal design to specific seal applications—including higher speed applications.

As previously noted, embodiments of the invention involve a dynamic feeding groove design that adds a pressure velocity component to the system. That is, the feed reservoir can be configured to utilize the velocity of the shaft to feed an associated groove. Moreover, such feeding can be increased with an increase in shaft rotational speed. It is noted, however, that as the shaft rotates, some amount of fluid can generally remain attached to the shaft. Additionally, embodiments of the present invention provide for an exit ramp (e.g., as shown as element 60 in FIG. 4). Notably, utilizing a pressure velocity component, some embodiments of seals taught by the invention can be run at relatively high speed without the need for any oil or air cooling.

Figure 5:
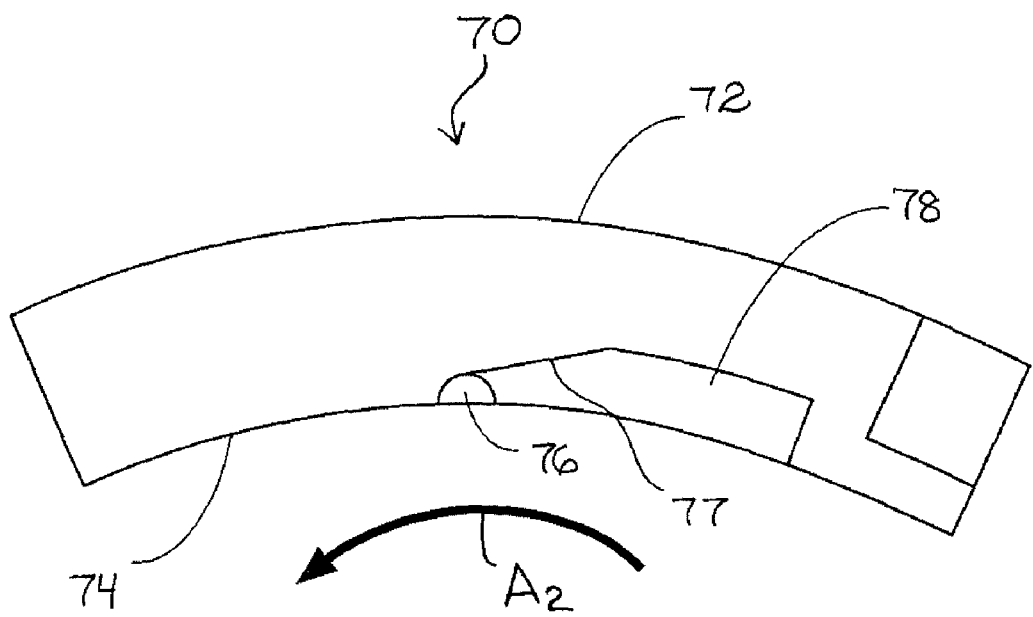
FIG. 5 is a side view of a portion of an embodiment of a portion of a radial seal ring segment.

Additional illustrations of an exemplary embodiment of the invention showing aspects of a dynamic feeding of a trough portion are illustrated in FIGS. 5 through 9. FIG. 5 generally illustrates a side view of a portion of a radial seal ring segment 70. The illustrated seal ring segment includes a segment outer diameter 72, a segment inner diameter 74, a feed cavity 76, a ramp portion 77, and a segment trough 78 (or trough area). Arrow $A_2$ generally represents the direction of shaft rotation. 3. In an embodiment, the ramp portion 77 includes an extended segment that extends substantially along the length of an adjacent pad.

Figure 6:
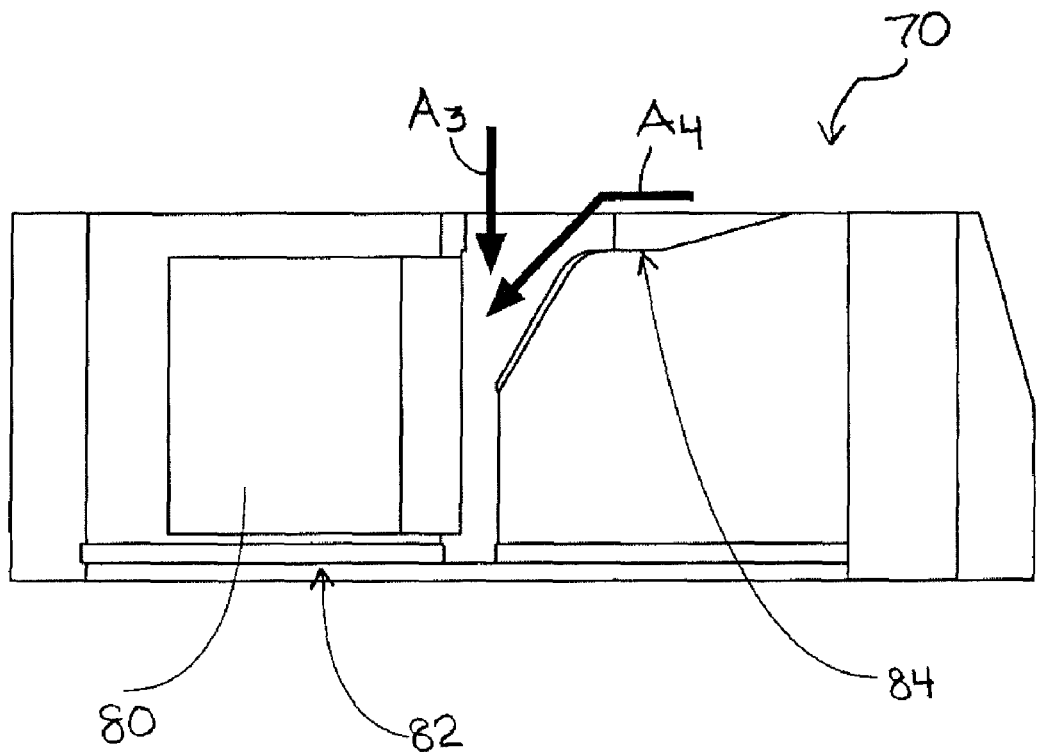
FIG. 6 is a partial segment bottom view of a radial seal ring segment of the type shown in FIG. 5.

FIG. 6 generally illustrates a partial segment bottom view of a radial seal ring segment 70 of the type shown in FIG. 5. As illustrated the seal ring segment 70 may include a hydrodynamically-configured lift pad 80, and a sealing dam 82. A segment trough 78 is also illustrated. With respect to FIG. 6, arrow $A_3$ generally depicts the direction of static feed to the seal ring segment 70 and arrow $A_4$ generally depicts the direction of dynamic feed to the seal ring segment 70.

It is noted that each segment 70 can cover a portion or angular segment of the 360 degrees that are commonly needed to provide a seal about or around a circular member—such as a rotating shaft. Moreover, each segment 70 may, and commonly will, include a plurality of hydrodynamically-configured lift pads 80. When a plurality of similar segments 70 are involved, the angular range covered by each segment 70 will typically be a multiple of 360°, such as 72° (5 radial seal segments), 90° (4 radial seal segments), 120° (3 radial seal segments), or 180° (2 radial seal segments).

Figure 7:
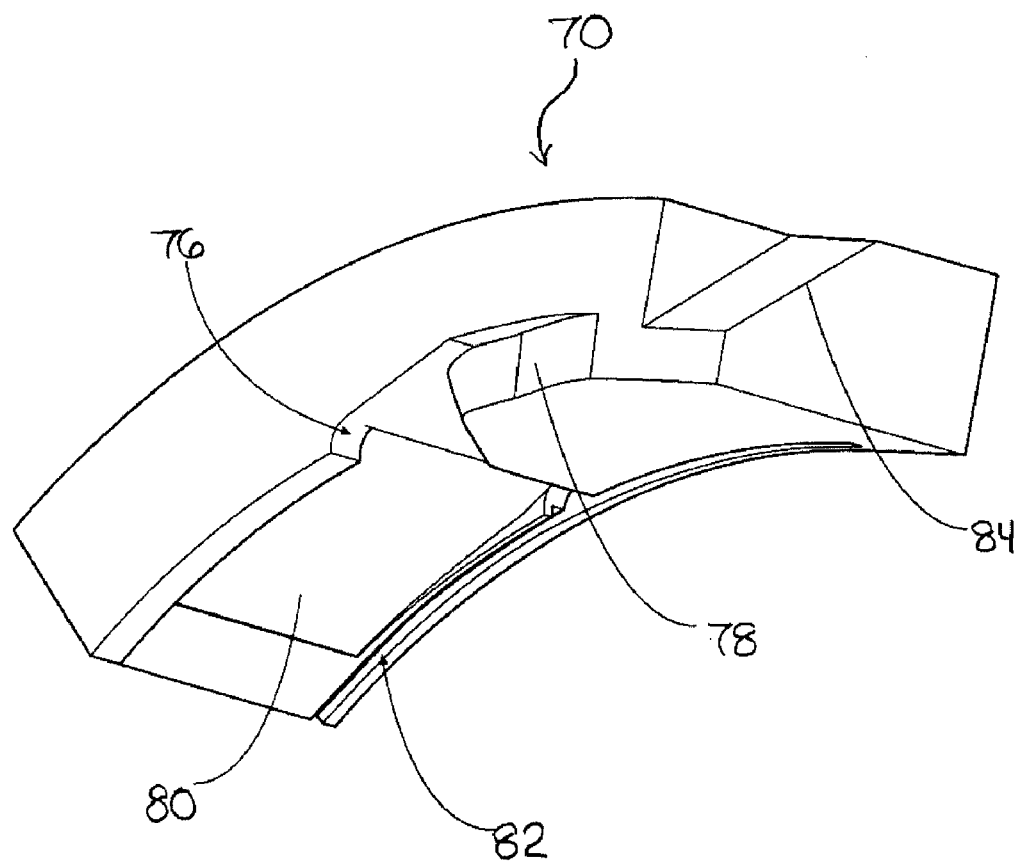
FIGS. 7, 8, and 9 are perspective views of a portion of a radial seal ring segment according to embodiments of the invention.
Figure 8:
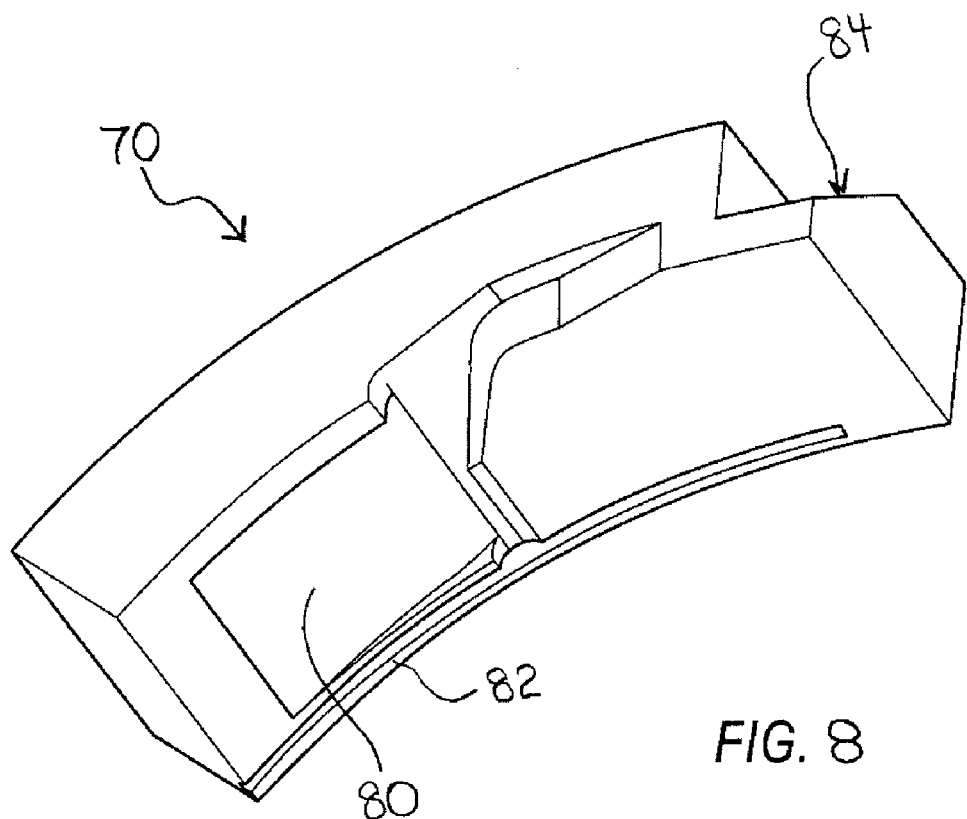
Figure 9:
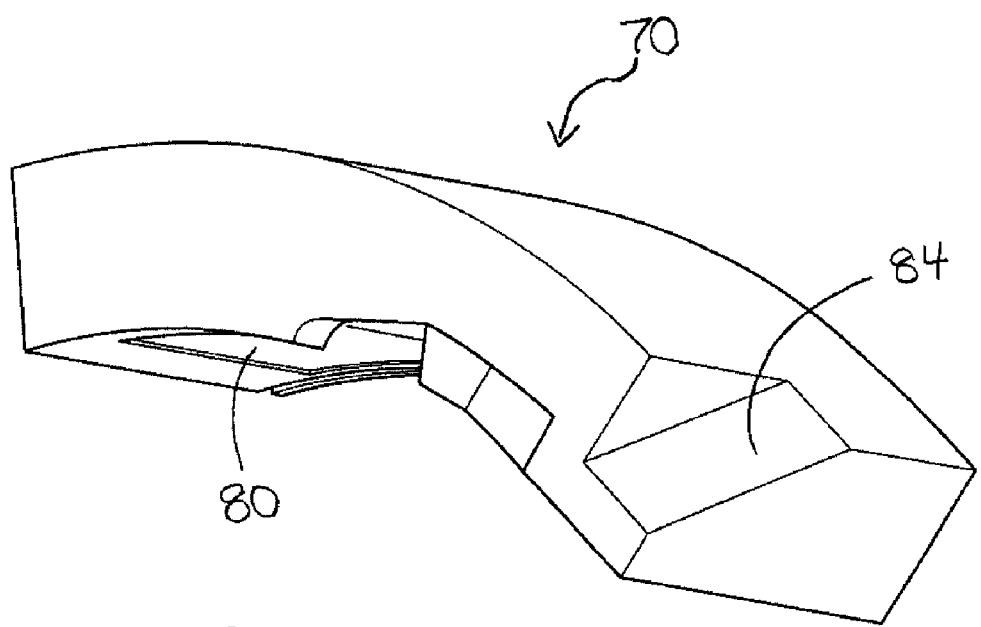

Several isometric views of a portion of a radial seal ring segment 70 according to embodiments of the invention are generally shown in FIGS. 7, 8, and 9. The illustrated seal ring segments 70 each include, inter alia, a segment trough 78, hydrodynamic pad 80, sealing dam 82, and a segment joint 84.

As generally illustrated in FIGS. 7-9, each seal ring segment 70 may include at least one transition portion (e.g., a segment joint 84), and preferably transition portions at each end. The transition portions serve to interface with or overlap (e.g., a sliding overlap) with an adjacent seal ring segment. By way of example, without limitation, the transition portion may comprise a segment joint 84, which can take the form of a diagonal cut that will mirror the cut of an opposing end of a successive radial seal segment. That is, in an embodiment, a segment joint 84 of a segment 70 can be configured to overlap and/or interconnect or interface with a segment joint from an adjacent segment 70. Therefore, as desired for many applications, and potentially for manufacturing efficiencies, each of the segments 70 can be substantially identical to one another.

In embodiments of the invention, the seal ring segments may be comprised of carbon. However, for some embodiments, the segment may be comprised of plastic, ceramic, or metal.

Moreover, for some embodiments, a radial external surface of each segment, i.e., the surface opposing the bore-side surface shown in FIG. 4, may include a retention groove (also referred to as a channel) configured to receive a receiving a spring (e.g., a garter spring). The retention groove may be configured such that, when the plurality of segments are positioned to engage one another, the spring is retained within or about the retention groove and serves to hold the associated segments in an interconnected configuration. If desired, the retention groove and spring may be of the type commonly employed by conventional segmented sealing ring assemblies.

Additionally, for some embodiments, an element, such as an anti-rotation device (e.g., a pin), may be used to connect the seal assembly to a housing so that the seal assembly does not rotate relative to the housing. Without limitation, the anti-rotation pin may comprise a metal pin; however, the pin could be comprised of other materials, such as plastic or ceramic.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims appended hereto and their equivalents.

What is claimed is:

1. A segment of a seal assembly for sealing against a rotating member, the segment comprising:
   a radial internal surface for sealing against said rotating member;
   at least a partial transverse groove for maintaining a pressure around portions of the segment; and
   two or more pads, including a ramp portion, a flow-control formation, a pad entrance, and a pad reservoir portion;
   wherein the ramp is configured to run substantially circumferentially along a high pressure fluid side on the segment to pick up fluid flow with an increase in velocity, the ramp includes an extended segment that extends circumferentially along more than half of the length of an adjacent pad, and the flow-control portion is configured to prevent fluid from flowing around or circumventing the pad entrance.

2. The segment of claim 1, wherein the flow-control element includes an angled portion or segment that is configured to direct flow towards the pad entrance.

3. The segment of claim 1, wherein the pad reservoir portion is configured to form a boundary to retain fluid during rotation.

4. The segment of claim 1, wherein the pad comprises a Rayleigh step or pad.

5. The segment of claim 1, wherein the ramp portion extends to a position adjacent the pad entrance.

6. The segment of claim 1, wherein the segment includes a joint or connection configuration that is adapted for an interconnecting or interlocking with a joint or connection configuration of an adjacent segment.

7. The segment of claim 1, wherein the fluid comprises air or some form of gas.

* * * * *